Patented May 9, 1950

2,506,908

UNITED STATES PATENT OFFICE 2,506,908

SMOKING AND FREEZING MEAT, FISH, AND POULTRY

Lewis S. Thompson, Red Bank, N. J.

No Drawing. Application August 21, 1946,
Serial No. 692,140

1 Claim. (Cl. 99—194)

The present invention relates to new food products and to a new method of producing the same. In the past, it has been the practice first to cure certain meats, fish and poultry, to preserve the flesh, and then to subject the cured products to a smoke treating operation, for an extended period of time, to impart the desired "smoky" taste thereto. In accordance with conventional practice, the products are cured by subjecting them to pickling solutions, salt solutions or by packing them in dry salt. The curing takes a substantial amount of time, such as two weeks or more when the dry curing is practiced. As is well understood in the art, the curing operation preserves the meat against the action of bacteria, which otherwise would result in relatively prompt spoiling or putrefaction.

The smoking operation has usually been adopted, to impart a pleasing flavor to the products and not primarily, if at all, to cure or preserve the flesh, unless carried to the point of dehydration. In some cases, however, where the smoking has been performed at elevated temperatures, or for extended times, or both, the products have been partially or completely cooked, or dried out, or both, as well as being smoked, and, to this extent, such a smoking operation may have had a curing or preserving effect.

The conventional curing steps employed prior to the usual smoking operation have always had an effect upon the products, and have changed their characteristics radically, as compared to the raw, fresh, non-cured, non-dried meat, fish or poultry. The difference between ham and fresh pork is illustrative of the change resulting from curing, as is the difference between fresh beef and corned beef or dried beef. Although these and other well known cured meat products enjoy very substantial popularity, due primarily to their salty and smoked taste, the consistency of the meat, prior to cooking, is quite different from fresh meat and the cooking processes are necessarily different, and usually more involved.

The smoking of raw, fresh products, such as pork, lamb, veal, beef, fish and poultry has never been practiced, as far as is known, for the reason that it has been generally thought that such fresh, raw products would spoil during the smoking operation, usually carried out at temperatures which would be conducive to the growth of bacteria and, hence, rapid putrefaction.

One of the principal objects of the present invention is to produce a fresh, non-cured, non-dried, smoked food product, having all of the advantages of fresh meat, fish, poultry or the like and none of the disadvantages of cured products, yet possessing the additional desirable quality of smoked products, namely, the improved, tasty, "smoky" flavor.

Another object is to provide a method of producing such a product, without any danger of spoiling, and which can be kept, under refrigeration, for indefinite periods of time, without spoiling and without any loss of flavor.

The invention provides a method consisting of a novel combination of steps which produce what is believed to be an entirely new and greatly improved food product.

Briefly stated, the process of the present invention consists in first smoking the raw, fresh meat, fish or poultry for a suitable period of time, entirely without any preliminary curing, then wrapping the smoked product, and then substantially immediately quick freezing the wrapped product. After the freezing operation has been completed, the frozen product may be stored indefinitely under refrigeration.

Describing the process more in detail, it should be pointed out that the products are first placed in a smokehouse, while they are still fresh, and before any spoiling has occurred. It is important to use a smokehouse having an external source of smoke, such as a wood-burning stove, spaced a substantial distance from the smokehouse and connected thereto by a pipe, in the neighborhood of fifteen feet long, so that the smoke entering the house is substantially cool and the temperature of the atmosphere in the smokehouse is not raised more than a few degrees above the outside atmospheric temperature. In practice, the temperature within the smokehouse has been maintained within two or three degrees of the outdoor temperature and this difference should not be exceeded, except when the outdoor temperature is quite cold. In any event, the temperature within the smokehouse should be kept low, to prevent the flesh from spoiling or from being partially cooked or dehydrated.

The smoking treatment is continued for from 12 to 24 hours, depending upon the size of the individual pieces being smoked. It has been found that for the average product, this time is sufficient for the smoke completely to permeate the material, and that longer times are not only of no utility but create a danger of spoiling and unduly dehydrate the flesh.

During this entire period, the smoke is preferably continuously delivered from the stove or other source of smoke so that the characteristics of the smoke within the smokehouse and the temperature of the atmosphere are maintained substantially constant.

It is important that the smoking operation is carried out under temperatures sufficiently low, and for a time period sufficiently short, to avoid substantial dehydration of the fresh flesh. Such dehydration decreases the weight of the products, increases their toughness, and otherwise changes the consistency of the flesh. Moreover, it adversely affects the subsequent freezing operation.

At the end of the smoking treatment, the meat, fish or poultry products are removed from the smokehouse and immediately wrapped in parchment paper, or other substantially moisture-proof sheet material, and then substantially immediately subjected to a quick freezing process, such as the "Birdseye" process or they may be simply placed in a freezing compartment maintained at a quick freezing temperature, such as 5° to 20° below zero F. This quick wrapping and freezing is desirable, to prevent the escape of the ingredients of the smoke, absorbed by the food products, which impart thereto the desired "smoky" flavor. Also, any substantial delay between the smoking operation and the freezing operation would be likely to result in spoiling of the flesh, particularly in warm weather.

After the products have been frozen hard, they may be removed from the freezing unit or the like and maintained indefinitely under refrigeration at a temperature below freezing.

When the products are to be consumed, they may be handled the same as any fresh, non-smoked, frozen meats, fish or poultry. Although the products have the appearance of fresh frozen, non-smoked foods, a particularly delicious taste will be found to have been imparted to them by reason of the smoking operation, although none of the characteristics of cured foods are present, such as the dry, tough, salty qualities of the latter. The flavor of the new product is difficult to describe, but the taste is similar to that imparted to food cooked over hickory coals or in an open fire, although actually cooked in a gas or electric broiler or oven.

The invention includes all modifications as to products and processes, described in the accompanying claim and their equivalents.

I claim:

The method of treating a food product of the class consisting of meat, fish and poultry which comprises subjecting the raw, fresh, uncured product to a smoking operation without substantial drying of the product, at a temperature not substantially above atmospheric temperature for a period of from 12 to 24 hours, wrapping the product substantially immediately at the conclusion thereof, and then substantially immediately quick-freezing the wrapped product.

LEWIS S. THOMPSON.

REFERENCES CITED

The following references are of record in the file of this patent:

UNITED STATES PATENTS

| Number | Name | Date |
| --- | --- | --- |
| 1,280,772 | Ligg | Oct. 8, 1918 |
| 2,119,716 | McKee | June 7, 1938 |

OTHER REFERENCES

Rideal, Disinfection and The Preservation of Food, John Wiley, New York city, 1903, pages 408 to 410.

Highlands et al., U. S. Egg and Poultry Mag., August 1941, pages 484–486.